3,291,448
HOISTING TRUCK FOR A TABLE HAVING A SINGLE-THROW LEVER AND PARALLELOGRAM MEMBERS
James R. Beebe, 6731 S. Lindsey, Pico-Rivera, Calif.
Filed Sept. 13, 1965, Ser. No. 486,987
8 Claims. (Cl. 254—10)

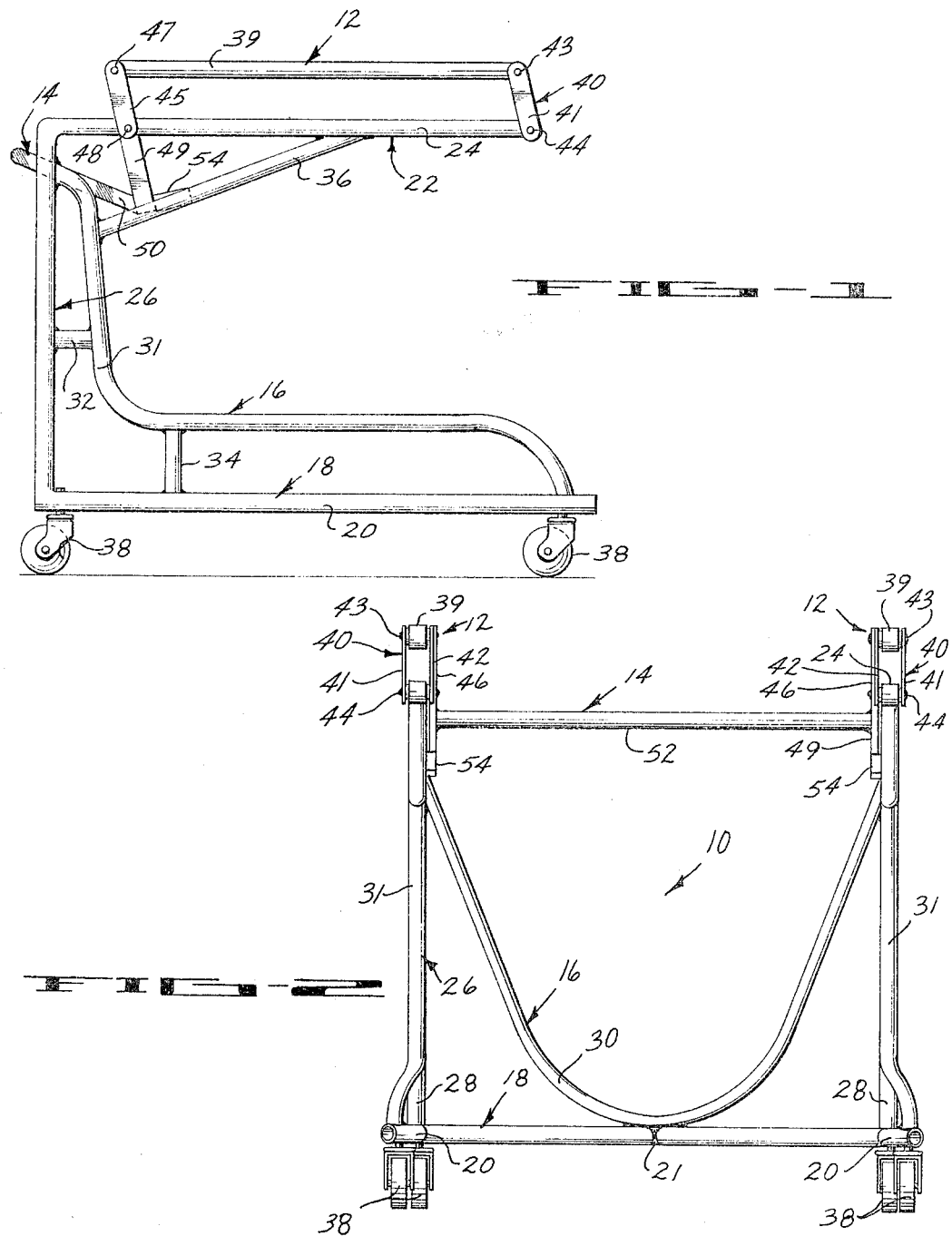

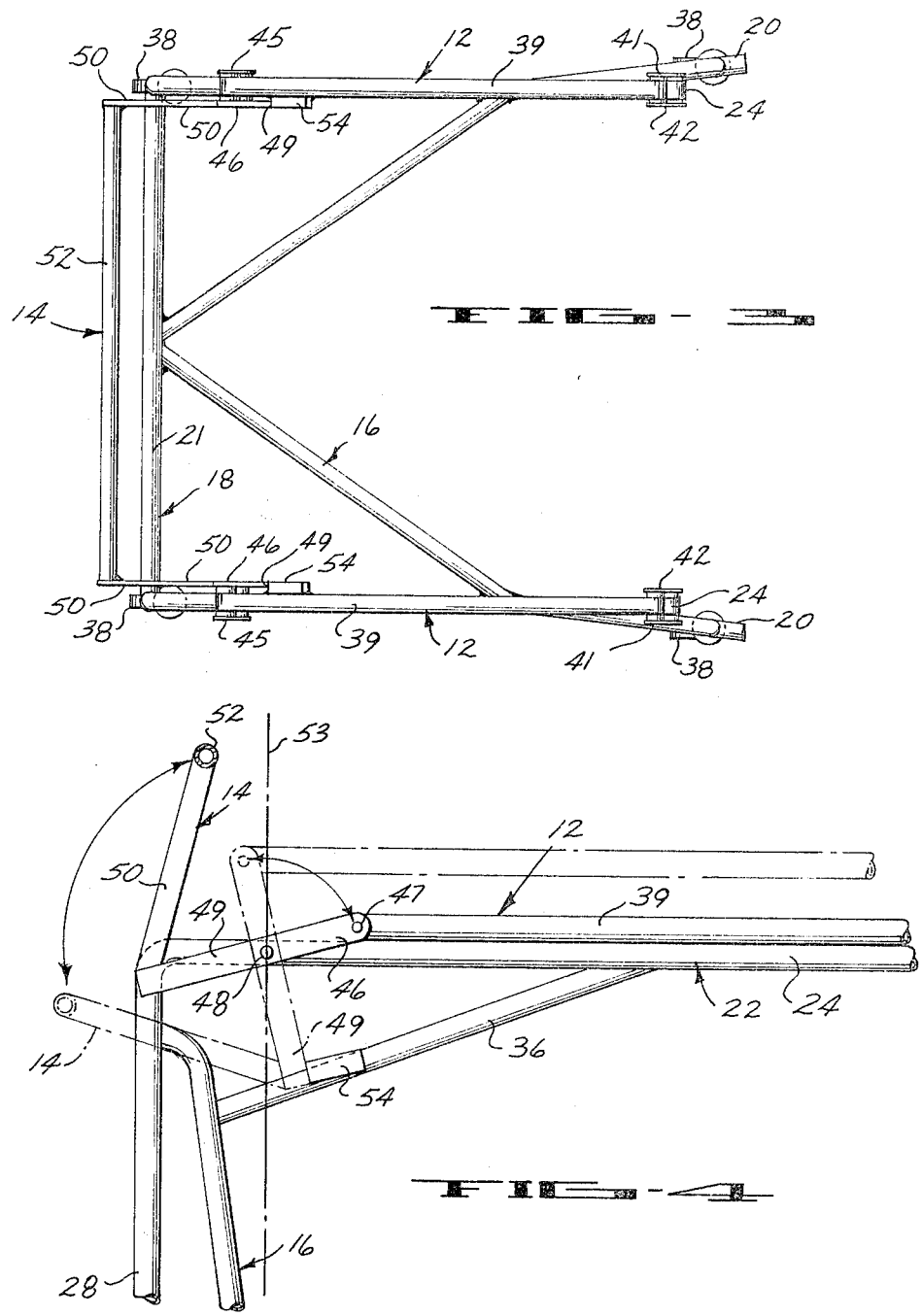

The present invention relates to the furniture moving apparatus and, more particularly, to an improved table lifting and moving device.

In restaurants, night clubs, hotels, and other establishments, it is often necessary to rapidly move large numbers of tables from one location to another, particularly before, during and after a dinner event. In the past this has required the use of a number of workmen, and even then has taken an appreciable length of time.

In such establishments, it also often becomes necessary to move a table that has already been set up with dishes, silver, table setting and the like. Under these conditions, it is exceedingly difficult, for even two workmen to move the table without disturbing its contents, particularly if it is desired to move the table with any appreciable speed.

Accordingly, it is an object of the present invention to provide a device which will allow one man to easily lift and rapidly move tables from one location to another without disturbing the contents thereof.

Another object of the present invention is to provide a device while will allow one man to rapidly and safely do the work of several men in lifting and moving tables from one location to another.

A further object of the present invention is to provide a device of the foregoing character which is simple in design, easy to maneuver, and inexpensive to construct and manufacture.

The foregoing as well as other objects and advantages of the present invention may be more clearly understood by reference to the following detailed description, when taken with the drawings which, by way of example only, illustrate one form of table lifting and moving device embodying the features of the present invention.

In the drawings:

FIGURE 1 is a side view of the table lifting and moving device;

FIGURE 2 is a front view of the table lifting and moving device;

FIGURE 3 is a top view of the table lifting and moving device; and

FIGURE 4 is a fragmentary side view illustrating the operation of the table lifting and moving device in raising and lowering a table.

In the drawings, the table lifting and moving device is represented generally by the numeral 10 and includes a pair of similar lifting mechanisms 12 connected by an actuating handle 14 and pivotally supported by a wheeled frame 16. The lifting mechanisms 12 are arranged such that when the handle 14 is in a raised position (see FIGURE 4), the lifting mechanisms are in a lowered position just below table height and ride with the frame 16 under a table. When the handle 14 is moved to a lowered position, however, (see FIGURE 1), the lifting mechanisms 12 are held in a raised position to support the table off the floor. With the table supported above the floor, it may be moved to any desired location simply by pushing forward on the handle 14 to roll the frame 16 over the floor. Once in the desired location, the table may be gently lowered to the floor by slowly returning the handle 14 to its raised position to cause the lifting mechanisms to slowly collapse. The device 10 then may be rolled from under the table, maneuvered to another table, and the foregoing operation repeated.

In this manner, the device 10 allows one workman to rapidly lift and move large numbers of tables with a minimum of effort. Also, during the lifting and maneuvering operations, the tables are maintained perfectly level. Therefore, the contents of the tables are not disturbed during moving with the device 10.

More particularly, the frame 16 has an open front end and preferably is formed of sections of tubular metal material welded or otherwise secured together into a lower portion 18, an upper portion 22 and a connecting portion 26. The lower portion 18 includes a pair of laterally spaced, coplanar, generally parallel, horizontal and forwardly extending lower side members 20 connected at their rearmost ends by a cross-member 21.

The upper portion 22 of the frame 16 includes a pair of coplanar, laterally separated, generally parallel, horizontal and forwardly extending upper side members 24 which are supported above the lower portion 18 by the connecting portion 26. To this end, the connecting portion 26 includes a pair of vertical side members 28, a vertical, U-shaped rear brace 30 between the side members 28 and the cross member 21, a pair of generally L-shaped braces 31, each extending from the front end of one of the lower side members 20 to an upper portion of one of the vertical side members 28, a brace 32 between each vertical side member 28 and an associated brace 31, a vertical 34 between each lower member 20 and an associated brace 31, and an inclined brace 36 connected to the bottom of each upper side member 24 and extending downwardly and rearwardly in the plane of the side member to connect to an upper portion of an associated brace 31. Thus arranged, the frame 16 is balanced and supported for rolling movement over the floor by four casters 38 connected to and extending downwardly from front and rear end portions of the lower side members 20.

As previously indicated, the lifting mechanisms 12 are adapted to be in a lowered, collapsed position when the handle 14 is in a raised position and to move to an expanded, raised position, lifting a table off the floor, as the handle is moved to a lowered position. To accomplish this, the lifting mechanism 12 includes a pair of parallel, coplanar, horizontal elevating members 39, one extending over and along each upper side member 24, and a linkage assembly 40 pivotally connecting each elevating member to its associated upper side member and to the handle 14.

Each linkage assembly 40 includes a pair of parallel, front-lifting members 41, 42 and a pair of parallel rear-lifting members 45, 46. The front lifting members 41, 42 extend on opposite sides of the associated elevating member 39 and upper side member 24 and are pivotally secured thereto by horizontal pivot pins 43 and 44, respectively, for movement in parallel vertical planes. The rear-lifting members 45, 46 also extend on opposite sides of the associated elevating member 39 and upper side members 24 and are pivotally connected thereto by horizontal pivot pins 47 and 48, respectively, for movement in parallel vertical planes. The length of rear-lifting members 45, 46 between the pivot pins 47 and 48 is equal to the length of the front-lifting members 41, 42 with longitudinal extensions 49 of the rear-lifting members 46 extending below and beyond the pivot pins 48 for the linkage assemblies 40.

The handle 14 is generally U-shaped and connects to the longitudinal extensions 49 at the lower ends thereof with side arms 50 extending at acute angles rearwardly and upwardly from the longitudinal extensions and a horizontal cross arm 52 extending between the side arms.

The cross arm 52 is adapted to be grasped by the workman operating the device 10, both to raise and lower the lifting mechanisms 12 and to push the frame 16 over the floor. In particular, to lower the lifting mechanisms 12, the workman lifts up on the cross arm 52. This causes the rear-lifting members 45, 46 to rotate in a clockwise direction about the pivot pins 48 (when viewed in FIGURES 1 and 4). As the rear-lifting members 45, 46 rotate in a clockwise direction, they cause the elevating members 39 to move forward and down to rest upon the top of the upper side members 24. At the same time, the front-lifting members 41, 42 are rotated forward in a clockwise direction about the pivot pins 44. The upper side members 24 prevent further forward movement of the elevating members 39 to define the collapsed, lowered position for the lifting mechanisms 12. In this position, the weight of the elevating members 39 acting on the pivot pins 44 and 47 maintains the lifting mechanisms in the lowered position until such time as it is desired to raise a table off the floor.

When it is desired to raise the lifting mechanisms 12, the workman pulls back and then pushes down on the cross arm 52. This causes the rear-lifting members 45, 46 to rotate in a counterclockwise direction about the pivot pins 48. As the rear-lifting members 45, 46 rotate in a counterclockwise direction, they cause the elevating members 39 to move rearward and upward over the top of the upper side members 24. At the same time, the front-lifting members 41, 42 are rotated rearward and upward in a counterclockwise direction.

When the longitudinal extensions 49 of the rear-lifting members 46 move below the upper side members 24 and beyond a vertical plane 53 including the pivot pins 48, the front sides thereof engage a stop means 54 which prevents further forward movement of the longitudinal extensions. In the illustrated form of the device 10, the stop means 54 takes the form of small rectangular blocks extending laterally from the insides of the inclined braces 36 of the frame 16 with the rear faces forward of the vertical plane 53. Therefore, when the longitudinal extensions engage the stop means 54, the pivot pins 47 lie to the rear of the vertical plane 53 to define an "over-center" condition for the rear-lifting members 45, 46. A like condition exists for the front-lifting members 41, 42 relative to the vertical plane of the pivot pins 44. In the over-center condition, the weight of the elevating members 39 produces counterclockwise forces which act on the stop means 54 to hold the elevating members in a raised position until such time as it is desired to lower the elevating members by lifting upward on the cross arm 52.

By way of summary, to move a table using the device 10, the handle 14 is raised, to lower the lifting mechanisms 12 such that the elevating members 39 lie below the top of the table. The device 10 is then rolled forward under the top of the table. If the table is supported by a central column, the open front end of the frame 16, allows the device 10 to be positioned around the column. Otherwise, the device 10 extends between corners supporting legs for the table.

Once the device 10 is positioned under the table top, the handle 14 is pulled back and down to expand the lifting mechanisms 12 to the over-center, raised position, with the longitudinal extensions 49 engaging the stop means 54. As the elevating members 39 move to the raised position, they contact the bottom surface of the table top, lifting the table from the floor while maintaining the table perfectly level so as not to disturb its contents.

In the raised position, the weight of the table tends to rotate the front and rear-lifting members of the linkage assemblies 41 in a counterclockwise direction (when viewed in FIGS. 1 and 4). Such movement is prevented by the stop means 54 which effectively lock the lifting mechanisms 12 in the raised position and allow the table to be moved from one location to the other simply by pushing forward on the cross arm 52.

When the table is in the desired position, the handle 14 is pulled upwardly to its raised position to collapse the lifting mechanisms 12 and slowly lower the table to the floor. The device 10 then may be rolled from under the table to another table and the foregoing operation repeated.

Accordingly, the device 10 allows one man to easily lift and rapidly move tables from one location to another without disturbing the contents thereof.

While in the foregoing, a particular table lifting and moving device has been described in some detail, changes and modifications may be made in the illustrated form without departing from the spirit of the present invention. It is therefore intended that the present invention be limited in scope only by terms of the following claims.

I claim:
1. A table lifter and mover, comprising:
   a tubular, metal frame including a lower portion having an open front and a pair of coplanar, generally parallel, laterally separated, forwardly extending, horizontal lower side members, an upper portion having an open front and including a pair of coplanar, generally parallel, laterally separated, forwardly extending, horizontal, upper side members for fitting under a table top, and a connecting portion between said upper and lower portions including a brace member below and in a vertical plane of one of said upper side members;
   casters connected to end portions of said lower side members for balancing and supporting said frame for rolling movement over a floor;
   a pair of similar, laterally separated, table lifting mechanisms including a pair of elongated, coplanar, horizontal elevating members, each extending over and along a different one of said upper side members of said frame, and a linkage assembly for each elevating member, each linkage assembly including a pair of generally parallel front lifting members extending vertically on opposite sides of front end portions of said elevating member and its associated upper side member, pivot means pivotally connecting said pair of front lifting members to said elevating member and to said associated upper side member for movement in vertical planes, a pair of generally parallel rear lifting members parallel to said pair of front lifting members and extending on opposite sides of rear end portions of said elevating member and said associated upper side member, one of said rear lifting members including a longitudinal extension below said associated upper side member, and pivot means pivotally connecting said rear lifting members to said elevating member and to said associated upper side member for movement in vertical planes;
   a generally U-shaped, lifting mechanism actuating handle extending at an angle rearwardly from and between lower end portions of the longitudinal extensions of said table lifting mechanisms;
   and stop means connected to said brace member forward of a vertical plane of said pivot means connecting said rear lifting members to said associated upper side member for there engaging said longitudinal extension to prevent forward movement of said longitudinal extension beyond said stop means.

2. A table lifter and mover, comprising:
   a frame including a lower portion having an open front end, an upper portion having an open front end and including a pair of generally parallel, laterally separated, forwardly extending, horizontal upper side members, and a connecting portion between said upper and lower portions including a brace member below and in a vertical plane of one of said upper side members;

wheels connected to said lower portion of said frame for balancing and supporting said frame for rolling movement over a floor;

a pair of similar, laterally separated, table lifting mechanisms including a pair of elongated, coplanar, horizontal elevating members, each extending over and along a different one of said upper side members of said frame, and a linkage assembly for each elevating member, each linkage assembly including a pair of generally parallel front lifting members extending vertically on opposite sides of front end portions of said elevating member and its associated upper side member, pivot means pivotally connecting said pair of front lifting members to said elevating member and to said associated upper side member for movement in vertical planes, a pair of generally parallel rear-lifting members parallel to said pair of front lifting members and extending on opposite sides of rear end portions of said elevating member and said associated upper side member, one of said rear-lifting members including a longitudinal extension below said associated upper side member, and pivot means pivotally connecting said rear-lifting members to said elevating member and to said associated upper side member for movement in vertical planes;

a generally U-shaped, lifting mechanism actuating handle extending at an angle rearwardly from and between lower end portions of the longitudinal extensions of said table lifting mechanisms;

and stop means connected to said brace member forward of a vertical plane of said pivot means connecting said rear-lifting members to said associated upper side member for there engaging said longitudinal extension to prevent forward movement of said longitudinal extension beyond said stop means.

3. A table lifter and mover, comprising:

a frame including a lower portion having an open front end, an upper portion having an open front end and including a pair of generally parallel, laterally separated, forwardly extending, horizontal upper side members, and a connecting portion between said upper and lower portions including a brace member below and in a vertical plane of one of said upper side members;

wheels connected to said lower portion of said frame for balancing and supporting said frame for rolling movement over a floor;

a pair of similar table lifting mechanisms including a pair of coplanar, elongated, horizontal, elevating members, each extending over a different one of said upper side members of said frame and a linkage assembly for each elevating member, each linkage assembly including a front lifting member extending on one side of front end portions of said elevating member and its associated upper side member, pivot means pivotally connecting said front lifting member to said elevating member and to said associated upper side member for movement in a vertical plane, a rear-lifting member parallel to said front lifting member and extending on one side of rear end portions of said elevating member and said associated upper side member, said rear-lifting member including a longitudinal extension below said associated upper side member, and pivot means pivotally connecting said rear-lifting member to said elevating member and to said associated upper side member for movement in a vertical plane;

a generally U-shaped, lifting mechanism actuating handle extending at an angle rearwardly from and between lower end portions of the longitudinal extensions of said table lifting mechanisms;

and stop means connected to said brace member forward of a vertical plane of said pivot means connecting said rear-lifting members to said associated upper side member for there engaging said longitudinal extension to prevent forward movement of said longitudinal extension beyond said stop means.

4. A table lifter and mover, comprising:

a frame including a lower portion having an open front end, an upper portion having an open front end and including a pair of generally parallel, laterally separated, forwardly extending, horizontal upper side members, and a connecting portion between said upper and lower portions;

wheels connected to said lower portion of said frame for balancing and supporting said frame for rolling movement over a floor;

a pair of similar table lifting mechanisms including a pair of coplanar, elongated, horizontal, elevating members, each extending over a different one of said upper side members of said frame and a linkage assembly for each elevating member, each linkage assembly including a front lifting member extending on one side of front end portions of said elevating member and its associated upper side member, pivot means pivotally connecting said front lifting member to said elevating member and to said associated upper side member for movement in a vertical plane, a rear-lifting member parallel to said front lifting member and extending on one side of rear end portions of said elevating member and said associated upper side member, said rear-lifting member including a longitudinal extension below said associated upper side member, and pivot means pivotally connecting said rear-lifting member to said elevating member and to said associated upper side member for movement in a vertical plane;

a generally U-shaped, lifting mechanism actuating handle extending at an angle rearwardly from and between lower end portions of the longitudinal extensions of said table lifting mechanisms;

and stop means connected to said frame and located forward of a vertical plane of said pivot means connecting said rear-lifting member to said associated upper side member for there engaging said longitudinal extension to prevent forward movement of said longitudinal extension beyond said stop means.

5. A table lifter and mover, comprising:

a frame including a lower portion having an open front end, an upper portion having an open front end and including a pair of generally parallel, laterally separated, forwardly extending, horizontal upper side members, and a connecting portion between said upper and lower portions;

wheels connected to said lower portion of said frame for balancing and supporting said frame for rolling movement over a floor;

a pair of similar table lifting mechanisms including a pair of coplanar, elongated, horizontal, elevating members, each extending over a different one of said upper side members of said frame and a linkage assembly for each elevating member, each linkage assembly including a front lifting member extending on one side of front end portions of said elevating member and its associated upper side member, pivot means pivotally connecting said front lifting member to said elevating member and to said associated upper side member for movement in a vertical plane, a rear-lifting member parallel to said front lifting member and extending on one side of rear end portions of said elevating member and said associated upper side member, said rear-lifting member including a longitudinal extension below said associated upper side member, and pivot means pivotally connecting said rear-lifting member to said elevating member and to said associated upper side member for movement in a vertical plane;

a lift mechanism actuating handle extending between the longitudinal extensions of said table lifting mechanisms;

and stop means connected to said frame and located forward of a vertical plane of said pivot means connecting said rear-lifting member to said associated upper side member for there engaging said longitudinal extension to prevent forward movement of said longitudinal extension beyond said stop means.

6. A table lifter and mover, comprising:

a frame including a lower portion having an open front end, an upper portion having an open front end and including laterally separated side members, and a connecting portion between said upper and lower portions;

wheels connected to said lower portion of said frame for balancing and supporting said frame for rolling movement over a floor;

a pair of laterally separated table lifting mechanisms including a pair of coplanar, parallel, horizontal elevating members, a pair of front lifting members each pivotally connected to one of said side members and to a front end portion of one of said elevating members for movement in a vertical plane, a pair of rear-lifting members parallel to said front lifting members and each pivotally connected to one of said side members and to a rear end portion of one of said elevating members for movement in a vertical plane, said rear-lifting members including longitudinal extensions below their pivotal connections to said side members;

a handle extending between said longitudinal extensions;

and stop means connected to said frame and located forward of a vertical plane of said pivotal connections of said rear lifting members for there engaging one of said longitudinal extensions to prevent forward movement of said longitudinal extensions beyond said stop means.

7. A table lifter and mover, comprising:

a frame having an open front;

wheels connected to a lower portion of said frame for balancing and supporting said frame for rolling movement over a floor;

a pair of laterally separated table lifting mechanisms including a pair of coplanar, parallel, horizontal elevating members, a pair of front lifting members pivotally connected to said frame and to front end portions of said elevating members for movement in parallel vertical planes, a pair of rear-lifting members parallel to said front lifting members and each pivotally connected to said frame and to rear end portions of said elevating members for movement in parallel vertical planes, one of said rear-lifting members including a longitudinal extension below its pivotal connection to said frame;

means rigidly connecting said rear-lifting members;

and stop means connected to said frame and located forward of a vertical plane of said pivotal connection of said rear lifting members for there engaging said longitudinal extension to prevent forward movement of said longitudinal extension beyond said stop means.

8. A table lifter and mover, comprising:

a wheel supported frame for rolling over the floor;

a pair of laterally separated table lifting mechanisms including a pair of coplanar, horizontal elevating members, a pair of front lifting members pivotally connected to said frame and to front end portions of said elevating members for movement in parallel vertical planes, a pair of rear-lifting members parallel to said front lifting members and each pivotally connected to said frame and to rear end portions of said elevating members for movement in parallel vertical planes, one of said rear-lifting members including a longitudinal extension below its pivotal connection to said frame;

means rigidly connecting said rear-lifting members;

and stop means connected to said frame and located forward of a vertical plane of said pivotal connection of said rear lifting members for there engaging said longitudinal extension to prevent forward movement of said longitudinal extension beyond said stop means.

References Cited by the Examiner

UNITED STATES PATENTS

| 1,484,947 | 2/1924 | Keck | 254—8 |
| 1,609,017 | 11/1926 | Firestone | 254—10 |
| 3,129,923 | 4/1964 | Kikuchi | 254—10 |

FOREIGN PATENTS

| 684,832 | 3/1930 | France. |
| 242,736 | 11/1925 | Great Britain. |

WILLIAM FELDMAN, *Primary Examiner.*

MILTON S. MEHR, *Examiner.*